E. J. POWERS.
CHUCK USED IN BROOM MAKING.
APPLICATION FILED FEB. 10, 1908.
899,679.
Patented Sept. 29, 1908.
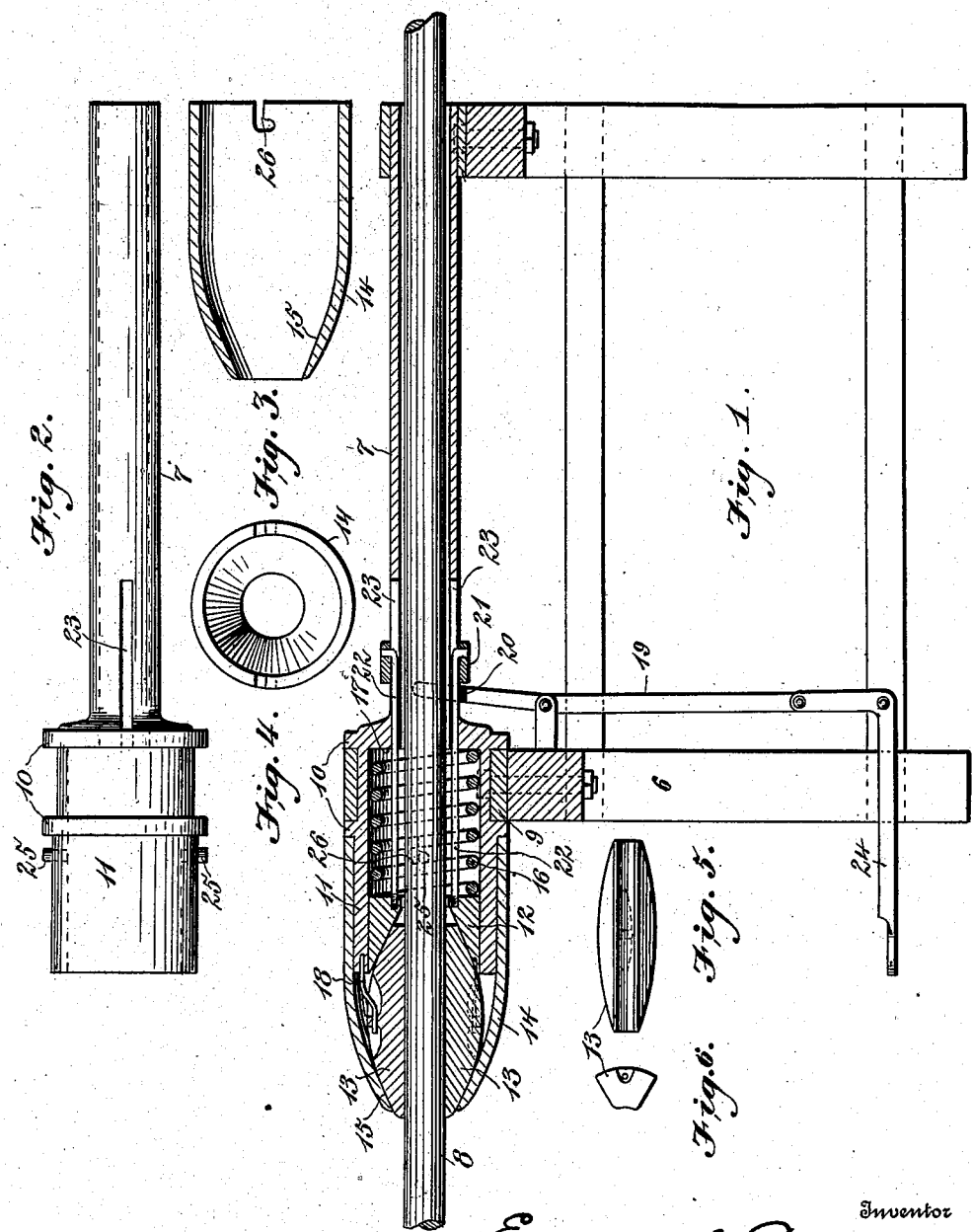

UNITED STATES PATENT OFFICE.

EDWARD J. POWERS, OF CHICAGO, ILLINOIS.

CHUCK USED IN BROOM-MAKING.

No. 899,679.   Specification of Letters Patent.   Patented Sept. 29, 1908.

Application filed February 10, 1908. Serial No. 415,205.

*To all whom it may concern:*

Be it known that I, EDWARD J. POWERS, citizen of the United States, residing at Chicago, in the county of Cook and State of Illinois, have invented certain new and useful Improvements in Chucks Used in Broom-Making, of which the following is a specification.

This invention is a "broom barrel" or chuck used in broom making, and has for its object to provide an improved chuck for holding a broom stick or handle and rotating the same, and it includes means for quickly engaging or releasing the handle, and for clamping it firmly while it is being rotated. The clutch jaws are closed by a beveled ring operated by a spring, and may be released by a lever connected to a treadle. Improved means are also provided for quickly changing the jaws, so as to act on handles of different sizes.

The invention is illustrated in the accompanying drawings, in which

Figure 1 is a vertical section of the device. Fig. 2 is a plan in detail of the tubular spindle. Figs. 3 and 4 are details in section and end view of the chuck shell. Figs. 5 and 6 are details in side and end view of one of the chuck jaws.

Referring specifically to the drawings, 6 indicates a frame of suitable construction on which the chuck or holder is mounted. The hollow spindle 7 is of proper size to receive a broom handle, indicated at 8, and said spindle rotates in bearings 9 on the frame. The spindle has circumferential flanges 10 at the front end which engage the sides of the bearing box and prevent endwise movement of the spindle. The spindle is enlarged at the front end, as at 11, to form a chamber in which the beveled ring 12 is slidable. Said ring is beveled on its inner surface, and the bevel acts upon one end of the jaws 13 which are held within a tapered shell 14 which fits at its rear end over the enlarged part 11 of the spindle. The shell is beveled on the inner side, as at 15, to bear against the opposite end of the jaws 13, and the shell and ring are beveled at equal angles so as to give a uniform tension on the handle throughout the whole length of the jaws, which is important, as it avoids marring the handle.

The ring 12 is normally pressed forward to close the jaws by means of a coil spring 16 located behind the ring and bearing at its front end against the ring and at its rear end against a shoulder 17 in the spindle. The jaws are supported by light springs 18 secured thereto and to the end of the spindle, and these merely act to hold the jaws in position and to release the same when the beveled closing ring is retracted. Said ring is normally advanced by the coil spring, but may be retracted by means of a lever 19 which has a fork 20 at the upper end engageable against a collar 21 which is slidable on the spindle and which is connected by rods 22 to the ring 12. Said rods move in slots 23 in the spindle shell. The lever 19 is operated by a treadle 24 connected thereto and fulcrumed on the frame. The shell 14 is held in place by pins 25 projecting outwardly near the front end of the spindle, the shell having bayonet slots 26 in which the pins are engaged.

In the use of the device, the closing ring 12 may be retracted by pressure on the treadle 24, allowing the jaws to open so that the broom handle can be inserted in the chuck. On release of the treadle the coil spring forces the closing ring forward and closes the jaws against the handle, in which position the handle can be readily turned or located for other work thereon. To substitute larger or smaller jaws, to accommodate handles of different sizes, it is simply necessary to turn and pull the shell 14 to disengage the same from the pin 25, allowing the shell to be pulled off at the end of the spindle, exposing the jaws which can then be readily changed, the old jaws being pulled off of the springs 18 and others substituted.

The chuck has a very quick action and will be found very serviceable for the purpose indicated.

I claim:

1. A work holder for broom handles or the like, comprising a tubular spindle enlarged at one end, a shell on said end of the spindle, beveled internally, a beveled closing ring slidable lengthwise in said end of the spindle, jaws located in said shell between the beveled part thereof and the ring, means to advance the ring to close the jaws, and means to retract the ring.

2. A work holder for broom handles or the like, comprising a tubular spindle having pins projecting laterally near one end thereof, a shell fitting over said end of the spindle and tapered at its front end and having bayonet slots at its rear end to receive the pins, jaws in the shell, and means to press the jaws against the tapered end of the shell to close the same.

3. A work holder for broom handles or the like, comprising a tubular spindle enlarged at the front end, jaws carried at the front end of the spindle, a bevel-closing ring slidable lengthwise within the said end and bearing upon the jaws to close the same, a coiled spring in the spindle behind the ring and tending to advance the same, and a shifting lever adjacent the spindle and connected to the ring, to retract the same.

In testimony whereof I affix my signature, in presence of two witnesses.

EDWARD J. POWERS.

Witnesses:
 NELLIE FELTSKOG,
 H. G. BATCHELOR.